US005777503A

United States Patent [19]

Faulk

[11] Patent Number: 5,777,503
[45] Date of Patent: Jul. 7, 1998

[54] PULSE WIDTH MODULATION BIAS TO MINIMIZE EFFECT OF NOISE DUE TO RAMP SWITCHING

[75] Inventor: Richard A. Faulk, Cypress, Tex.

[73] Assignee: Compaq Computer Corporation, Houston, Tex.

[21] Appl. No.: 605,394

[22] Filed: Feb. 22, 1996

[51] Int. Cl.[6] .................................................. H03K 5/08
[52] U.S. Cl. .......................... 327/323; 327/538; 327/137; 323/287; 323/288; 323/242
[58] Field of Search .............................. 327/137, 139, 327/323, 331, 332, 538, 540; 323/240, 242, 254, 266, 287, 288

[56] References Cited

U.S. PATENT DOCUMENTS 4,837,495  6/1989  Zansky ................................ 323/222
4,959,606  9/1990  Forge ................................. 323/286
5,111,133  5/1992  Paulo et al. ......................... 323/286
5,264,780  11/1993  Bruer et al. ........................ 323/222
5,367,247  11/1994  Blocher et al. ..................... 323/222

Primary Examiner—Timothy P. Callahan
Assistant Examiner—Jung Ho Kim
Attorney, Agent, or Firm—Pravel, Hewitt, Kimball & Krieger

[57] ABSTRACT

A control system using pulse width modulation, current-mode control to regulate a flyback converter for small input currents. The control system generates a ramp voltage indicative of an input current of the converter with an added bias to overcome the effects of switching noise attributable to parasitic elements in the converter. The ramp voltage is compared with an error voltage is order to obtain the pulse width modulated on-time of a primary switch. Thus, the control system maintains control for small duty cycles of the primary switch by having a control region immune to switching noise.

10 Claims, 6 Drawing Sheets 5,777,503

1

PULSE WIDTH MODULATION BIAS TO MINIMIZE EFFECT OF NOISE DUE TO RAMP SWITCHING

BACKGROUND OF THE INVENTION

1. Field of the Invention

The present invention relates to the control of switching power supplies and more particularly to a control system for providing precision control of the switching power supply for low input currents.

2. Description of the Related Art

Due to their compact size and efficiency, switching power supplies have been very desirable for supplying power to electronic equipment, such as laptop computers. One switching power supply known for its low cost and small number of components has been a flyback converter. In the flyback converter circuit, conventional alternating current wall voltage was rectified and filtered in order to produce an unregulated direct current input voltage. This unregulated direct input voltage was then provided to an input circuit which included a primary winding of a power transformer.

The flyback converter further included an output circuit which included a secondary winding of the power transformer. The output circuit developed the appropriate direct current output voltage levels for the electronic equipment. A control system regulated the output voltage of the power supply by constantly switching current, through the use of a primary switch in the input circuit and a rectifier in the output circuit, in order to transfer power to the output circuit. The primary switch was typically a metal-oxide-semiconductor field-effect-transistor (MOSFET).

In order to regulate an output voltage of the flyback converter within a specific tolerance band, negative feedback, pulse width modulation (PWM) control has typically been used. One type of feedback control was known as current-mode control where a control circuit monitored both a switched current of the converter and the output voltage of the converter.

The control circuit generated a ramp voltage indicative of the monitored switched current where the conduction time of the primary switch was determined by the time for the ramp voltage to go from zero volts to a control voltage. The control voltage was an error signal representative of the difference between a reference voltage and the output voltage. The ratio of the conduction time of the primary switch to its switching period has been referred to as the duty cycle of the primary switch.

For a momentary decrease in the output voltage, the control voltage increased. Because of the increased control voltage, the ramp voltage took longer to reach the control voltage which increased the conduction time of the primary switch and the power input to the converter. Thus, the control system compensated for the momentary decrease in output voltage by increasing the power input to the power transformer.

Similarly, for a momentary increase in the output voltage, the control voltage decreased. Because of the decreased control voltage, the ramp voltage reached the control voltage more rapidly which decreased the conduction time of the primary switch and the power input to the converter. Thus, the control system compensated for the momentary increase in output voltage by decreasing the power input to the power transformer.

As mentioned above, the ramp voltage was indicative of the monitored switched current. Because of the smaller

2 currents in the input circuit of the flyback converter, the monitored switched current was typically the current in the primary winding of the power transformer. The ramp voltage was provided by a current sensing resistor coupled in series with the primary winding. The ramp voltage was an indication of the primary current, which had an associated noise voltage attributable to parasitic elements present in the input circuit. This noise voltage, which was significant to small ramp voltages, effectively governed the minimum conduction time and duty cycle of the primary switch. If the control system required smaller primary switch conduction times, false triggering due to the randomness of the ramp voltage would result in the loss of control of the converter.

In order to cope with this problem, most control systems required a blanking period or provided noise filtering. These techniques still resulted in minimum duty cycles which were unacceptable or not entirely sufficient.

SUMMARY OF THE PRESENT INVENTION

The present invention relates to a new and improved pulse width modulation (PWM) control system for a switching power supply that is immune to switching noise present in the converter. A bias is applied to a monitored switched current signal synchronous with the activation of a converter switch in order to generate a ramp signal which is used to control the conduction time of the converter switch.

In the preferred embodiment, the present invention relates to a current-mode control system for controlling a variable frequency, fully discontinuous flyback converter. The control system directly adjusts a primary current of the converter in order to regulate an output voltage. In order to monitor the primary current, the control system monitors the voltage across a current sensing resistor placed in series with a primary winding of a power transformer.

The control system provides a voltage bias to this monitored voltage synchronous with the initial conduction of a primary switch in order to create a ramp signal. The ramp signal has a control region immune from switching noise. The conduction time of the primary switch is governed by regulating the peak magnitude of the primary current by comparing the magnitude of the control region of the ramp signal with the magnitude of a control signal.

The control region of the ramp signal stays above the noise floor present in the ramp signal which allows precision control for small primary currents, minimizing the effects of the switching noise present in the converter. Thus, the present invention relates to a PWM control system for the switching power supply where the minimum allowable conduction time of the primary switch is reduced by minimizing the effects of switching noise present in the converter.

BRIEF DESCRIPTION OF THE DRAWINGS

A better understanding of the present invention can be obtained when the following detailed description of the preferred embodiment is considered in conjunction with the following drawings, in which:

FIG. 3 is a schematic diagram illustrating the control system of FIG. 1;

DETAILED DESCRIPTION OF THE PREFERRED EMBODIMENT

1. Prior Art Design Considerations

In order to more clearly understand the present invention, a review of prior art power compensation is presented.

Figure 1:
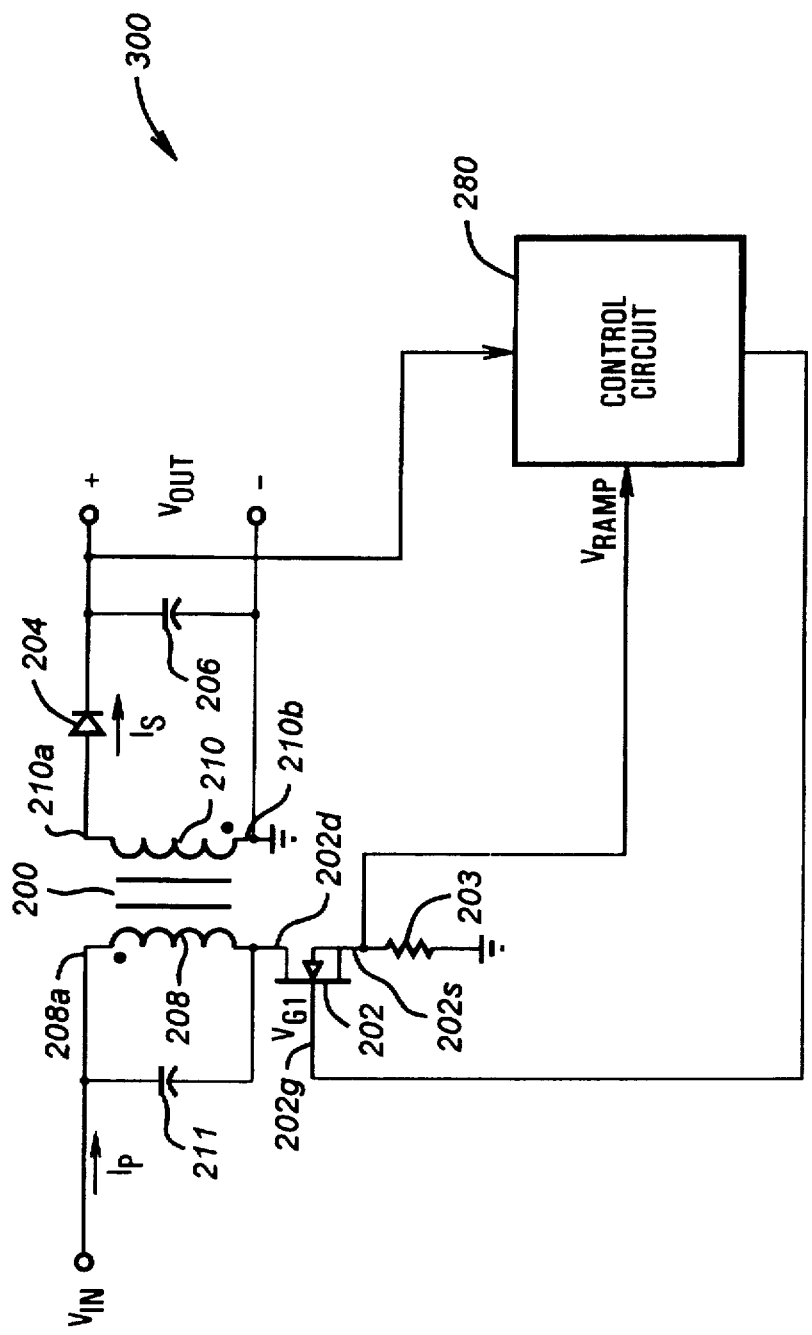
FIG. 1 is a schematic diagram illustrating a flyback converter having a control system of the prior art.
Figure 3:
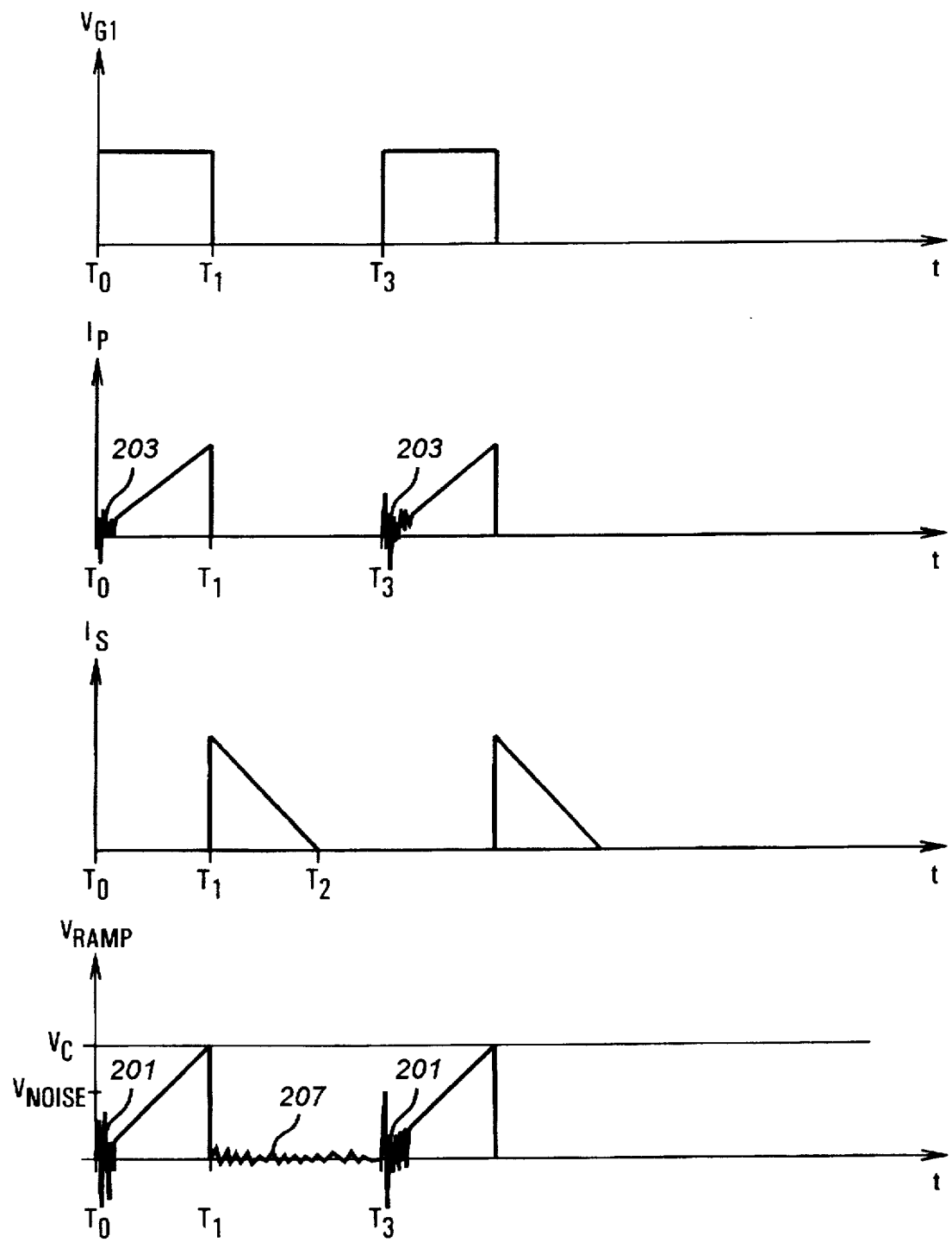
FIG. 3 illustrates the waveforms present in FIGS. 1 and 2.

FIG. 1 is a schematic diagram used to illustrate operation and problems of flyback control systems of the prior art with associated waveforms illustrated in FIG. 3. A flyback, variable frequency converter 300 has a power transformer 200 which has a primary winding 208 and a secondary winding 210. An input voltage $V_{IN}$ is provided to a terminal 208a of primary winding 208 by an input power source (not shown), and another terminal of primary winding 208 is connected to a drain terminal 202d of an N-channel, enhancement type metal-oxide-semiconductor field-effect-transistor (MOSFET) 202.

A control signal $V_{G1}$ is provided to a gate terminal 202g of transistor 202. $V_{G1}$ is a pulse train signal with a varying frequency and duty cycle used to control the switching of transistor 202 which functions as an on-off switch. Shown in FIG. 3 is one period of $V_{G1}$. From time $T_0$ to time $T_1$, $V_{G1}$ turns on transistor 202, and from time $T_1$ to time $T_3$ $V_{G1}$ turns off transistor 202.

A source terminal 202s of transistor 202 furnishes a current sensing signal $V_{RAMP}$. The magnitude of $V_{RAMP}$ is representative of the waveform of a primary current $I_p$. $I_p$ represents the current in primary winding 208 with its orientation shown in FIG. 1. Although the primary current $I_p$ is sensed, alternative embodiments might include sensing other currents of the converter. These currents are all representative of currents present in inductive elements of the converter 300.

As shown in FIG. 3, $V_{RAMP}$ and $I_p$ increase in a linear fashion from time $T_0$ to time $T_1$ when $V_{G1}$ is asserted and transistor 202 is conducting. From time $T_1$ to time $T_3$, $V_{RAMP}$ and $I_p$ are both negated. Both $V_{RAMP}$ and $I_p$ have an associated switching noise, 201 and 203, respectively, present near time $T_0$ and time $T_3$ when transistor 202 begins to conduct. In order to furnish the $V_{RAMP}$ signal, one end of a sense resistor 212 is connected to the source terminal 202s of the transistor 202 with the other end of sense resistor 212 being connected to a primary side ground.

Other embodiments are envisioned that provide a voltage signal whose magnitude is representative of the level of primary current $I_p$. For example, an auxiliary winding of transformer 200 could be utilized to sample the voltage across primary winding 208. In this configuration, a resistor and a capacitor could then be employed to form a voltage representation of $I_p$.

Other embodiments are also envisioned of other power conversion topologies. Thus, for example, the converter 300 might alternatively be a half bridge, full bridge, Buck or Sepic converter, or some other power conversion arrangement.

Flyback converter 300 also uses a secondary winding 210 of transformer 200 with a terminal 210b of secondary winding 210 connected to secondary side ground. A terminal 210a of secondary winding 210, having the opposite polarity of terminal 208a, is connected to the anode of a diode 204 which rectifies the signal provided from secondary winding 210. The cathode of diode 204 provides a direct current output voltage $V_{OUT}$. A capacitor 206 has one end connected to $V_{OUT}$ with the other end of capacitor 206 connected to secondary side ground. As shown in FIGS. 1 and 3, a secondary current $I_S$ flows through secondary winding 210 when transistor 202 is not conducting. From time $T_0$ to time $T_1$, $I_S$ is negated, and from time $T_1$ to time $T_2$, $I_S$ decreases in a linear fashion.

Also shown in FIG. 1 is a control circuit 280 of conventional design which furnishes $V_{G1}$ in response to two input signals, $V_{OUT}$ and a ramp signal $V_{RAMP}$. The design of control circuit 280 is well-known to those skilled in the art.

Control circuit 280 provides current-mode control by using pulse width modulation (PWM) techniques to control the conduction time of transistor 202. As explained below, control circuit 280 does this by regulating the peak magnitude of $I_p$. Control circuit 280, by negating $V_{G1}$, turns off transistor 202 for a fixed time. This is otherwise referred to in the industry as control circuit 280 providing a fixed off-time for transistor 202.

Other embodiments for control circuit 280 are envisioned. For example, control circuit 280 can regulate the average value of $I_p$, otherwise known as tolerance band control; or control circuit 280 can provide a constant switching frequency and turn on transistor 202 at the beginning of each switching cycle, where the conduction time of transistor 202 is governed by the peak magnitude of $I_p$. All of these current-mode techniques utilize $V_{OUT}$ and $V_{RAMP}$ and do not depart from the spirit of the invention. As described more fully below, when transistor 202 is first turned on, the major component of $V_{RAMP}$ is noise which effectively sets the conduction time and duty cycle of transistor 202.

Now describing the overall operation of flyback converter 300, control circuit 280 asserts $V_{G1}$ at time $T_0$ and negates $V_{G1}$ at time $T_1$. The time interval from time $T_0$ to time $T_1$ is the time during which transistor 202 conducts. This conduction time is governed by control circuit 280 through $V_{RAMP}$ and $V_{OUT}$ which is explained in greater detail below. As can be seen from FIG. 3, from time $T_0$ to time $T_1$, $V_{IN}$ exists across primary winding 208 and the primary current $I_p$ increases in a linear fashion. From time $T_0$ to time $T_1$, the secondary current $I_s$ is negated because the polarity of secondary winding 210 ensures diode 204 does not conduct.

At time $T_1$, control circuit 280 negates $V_{G1}$ and transistor 202 no longer conducts. At time $T_1$, the polarity of the voltage present on secondary winding 210 reverses, and diode 104 conducts. This permits the secondary current $I_S$ to flow through secondary winding 210. As can be seen from FIG. 3, $I_S$ decreases in a linear fashion from time $T_1$ to time $T_2$. Because, in the embodiments described converter 300 is operating in a fully discontinuous mode, $I_S$ is negated before time $T_3$, the time when another power cycle begins.

Thus, from time $T_0$ to time $T_1$, energy is transferred from the input power source to the electromagnetic field of transformer 200. From time $T_1$ to time $T_2$ energy is transferred from the electromagnetic field of transformer 200 to output capacitor 206. At time $T_3$ control circuit 280 asserts $V_{G1}$, and transistor 202 once again conducts, beginning another power cycle of flyback converter 300.

Figure 2:
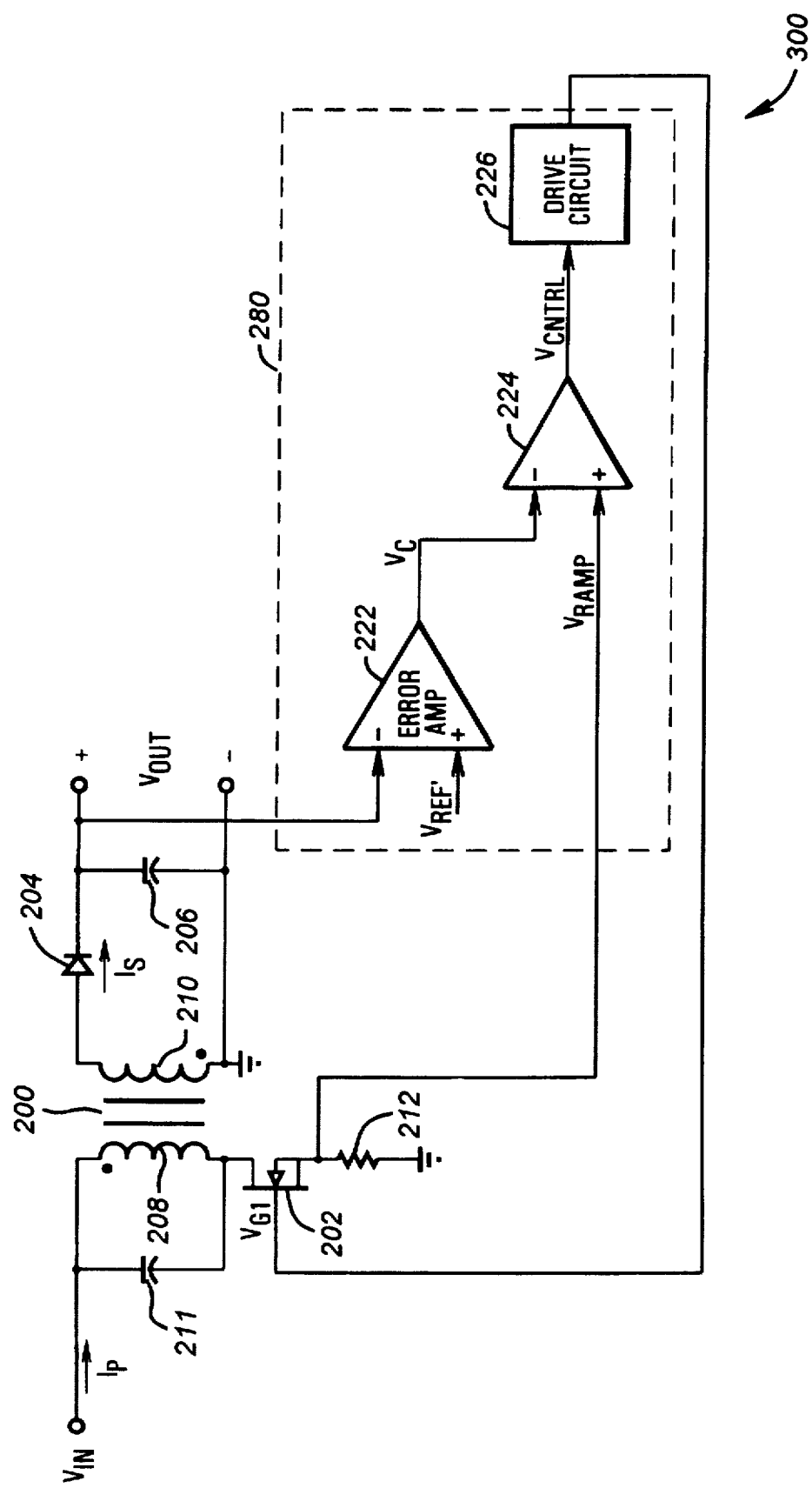
FIG. 2 is a schematic diagram illustrating the control system of FIG. 1.

In control circuit 280, as shown in FIG. 2, an error amplifier 222 has as its inputs $V_{OUT}$ and a reference voltage $V_{REF}$. Error amplifier 222 compares its two input signals, $V_{OUT}$ and $V_{REF}$, and provides a control signal, $V_C$, based on their difference. A conventional frequency compensation circuit is typically provided for error amplifier 222 but is not shown in the drawings. As shown in FIG. 3, $V_C$ is a direct current voltage signal used to directly control $I_p$ by regulating the peak amplitude of $I_p$ which is represented by $V_{RAMP}$.

A comparator 224 has $V_C$ provided to its inverting input and $V_{RAMP}$ provided to its noninverting input. When $V_{RAMP}$ reaches a level equal that of $V_C$, comparator 224 asserts its output signal $V_{CNTRL}$. Before $V_{RAMP}$ reaches $V_c$, $V_{CNTRL}$ is low. The assertion of $V_{CNTRL}$ by drive circuit 226 turns off transistor 202.

Also shown in FIG. 2 is a conventional drive circuit 226, the design of which is well-known to those skilled in the art. On the low-to-high transition of $V_{CNTRL}$, drive circuit 226 negates $V_{G1}$. Thus, the conduction time of transistor 202 is subject to pulse width modulation (PWM). The time when transistor 202 does not conduct is also controlled by drive circuit 226 which provides a fixed off-time, the time which drive circuit 226 negates $V_{G1}$.

In control circuit 280, as shown in FIGS. 2 and 3, the signal $V_{RAMP}$ produced by ramp generator 250 has a peak amplitude which is governed by $V_C$. $V_C$ is an error voltage resulting from the comparison of $V_{OUT}$ with a reference voltage $V_{REF}$. A momentary decrease in $V_{OUT}$ causes an associated increase in $V_C$ which in turn increases the time interval from time $T_0$ to time $T_1$. Transistor 202 conducts until the low-to-high transition of $V_{CNTRL}$.

Thus, a momentary decrease in $V_{OUT}$ results in a longer conduction time for transistor 202 which increases the power provided to transformer 200 to compensate for the momentary drop in $V_{OUT}$. Control circuit 280 compensates for a momentary increase in $V_{OUT}$ in an analogous manner by decreasing the power provided to transformer 200.

A noise voltage component present in $V_{RAMP}$ effectively sets the minimum conduction time of transistor 202. The noise voltage component includes the turn-on noise 201 and a background noise 207. The turn-on noise 201 is present when the transistor 202 first conducts. The turn-on noise 201 is primarily attributable to a parasitic capacitance coupled to parallel with primary winding 208. This parasitic capacitance is represented by a capacitor 211. The electromagnetic field of the transformer 200 also generates noise at various points in the converter 300. If $V_C$ drops below a maximum noise floor voltage level $V_{NOISE}$ then erratic switching of transistor 202 occurs.

2. The Present Invention

Figure 4:
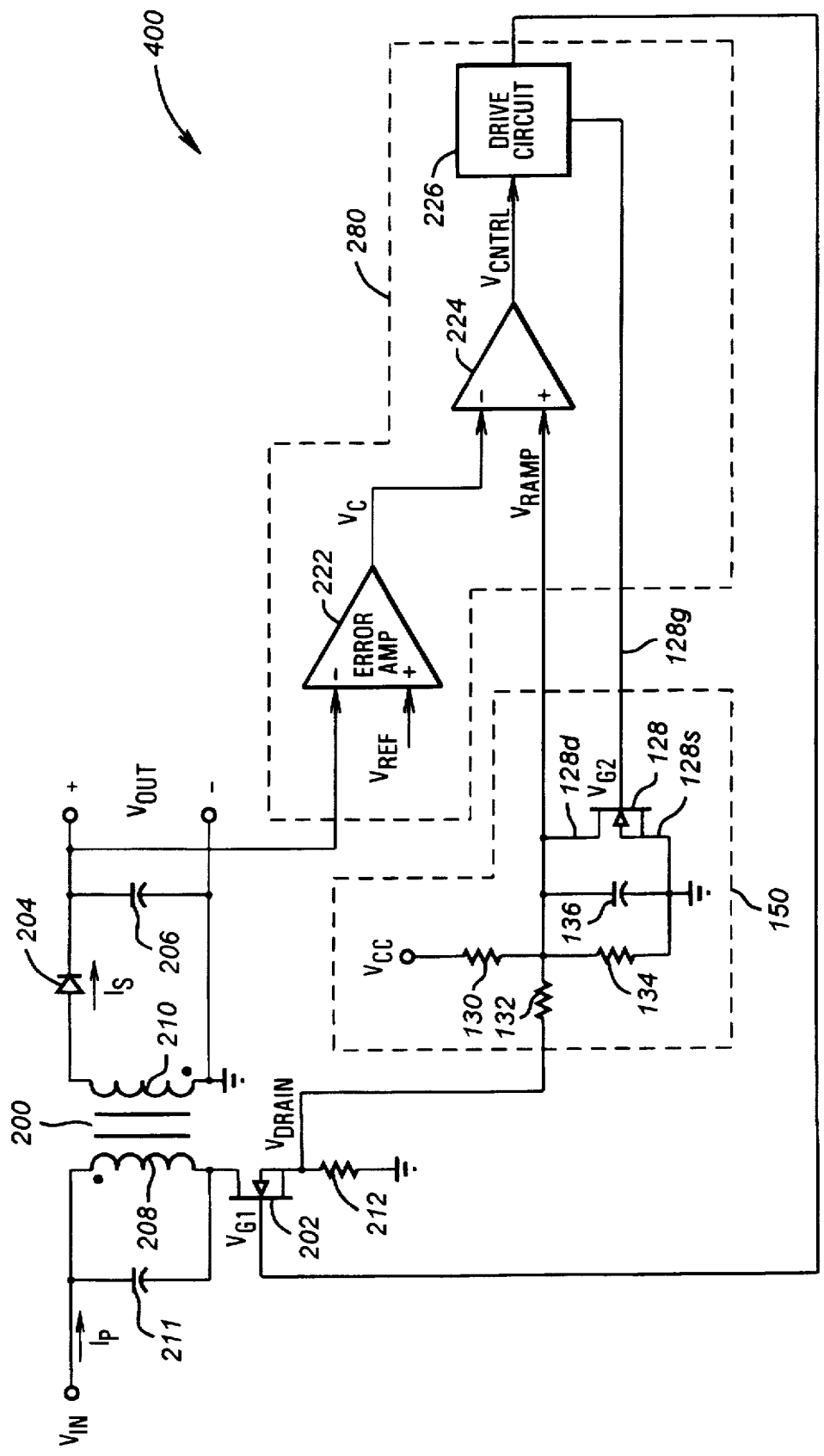
FIG. 4 is a schematic diagram illustrating the preferred embodiment according to the present invention.

Shown in FIG. 4 is a schematic diagram of a flyback converter 400 of the preferred embodiment of the present invention. The present invention relates to effectively lowering the noise floor voltage level $V_{NOISE}$. Now referring to the differences between flyback converter 400 and flyback converter 300, a ramp generator 150 is coupled to the sensing resistor 212 and is used to furnish the $V_{RAMP}$ signal to the control circuit 280.

In the ramp generator 150 of FIG. 4, a signal representative of the current in resistor 212, $V_{SENSE}$, is provided to one end of a resistor 132, and the other end of resistor 132 is connected to $V_{RAMP}$. A resistor 130 is coupled between a supply voltage $V_{CC}$ and $V_{RAMP}$. A resistor 134 is connected between $V_{RAMP}$ and ground. A capacitor 136 is also connected between $V_{RAMP}$ and ground.

Figure 5:
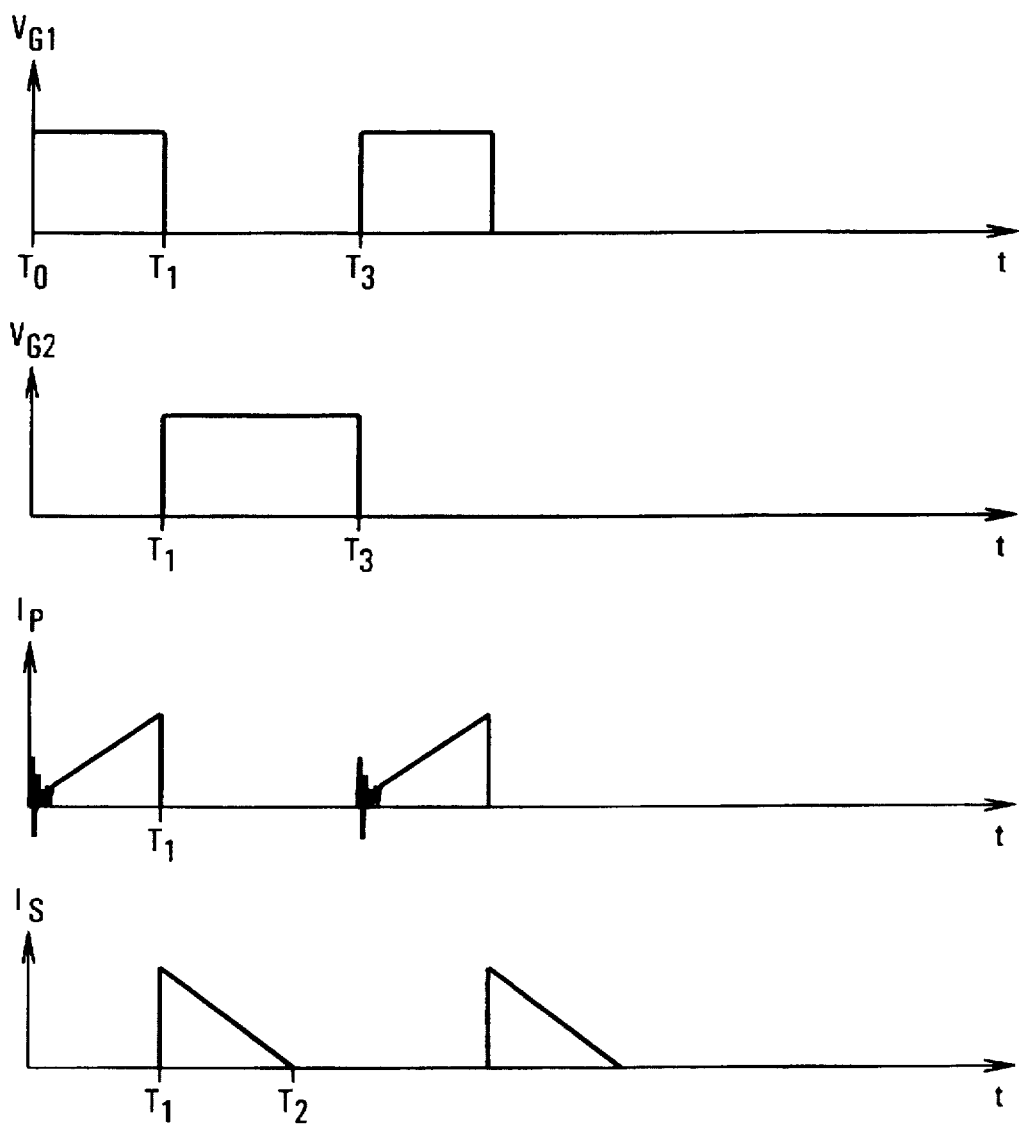
FIG. 5 illustrates the waveforms present in the flyback converter shown in FIG. 4.

An N-channel, enhancement type, MOSFET 128 has a drain terminal 128d connected to $V_{RAMP}$ and a source terminal 128s connected to ground. Drive circuit 226 provides a signal $VG_2$ to a gate terminal 128g of transistor 128 in order to discharge capacitor 136 during the time when transistor 202 is not conducting. As shown in FIG. 5, $V_{G2}$ is asserted when $V_{G1}$ is negated.

Resistors 130, 132 and 134 in conjunction with the supply voltage $V_{CC}$ provide a voltage bias $V_{BIAS}$ for $V_{RAMP}$ synchronous with the conduction of transistor 202. The $V_{BIAS}$ voltage level furnishes a control region 151 (FIG. 6) of the $V_{RAMP}$ signal which is used to immunize the flyback converter 400 from the noise generated by the initial conduction of transistor 202. Transistor 128 ensures that $V_{CNTRL}$ is negated once transistor 202 no longer conducts. Capacitor 136, as will be discussed below, provides a very precise gain control for a small $I_p$ by rounding or smoothing the otherwise abrupt positive sloping edge of $V_{RAMP}$. Capacitor 136 also filters noise that may be imposed on $V_{BIAS}$ and conducted from $V_{SENSE}$.

In flyback converter 400, as shown in FIG. 5, $I_p$ increases in a linear fashion from time $T_0$ to time $T_1$. This time interval is the conduction time of transistor 202. At time $T_1$, $V_{RAMP}$ equals $V_c$ and comparator 224 asserts $V_{CNTRL}$. This low-to-high transition of $V_{CNTRL}$ triggers drive circuit 226 to negate $V_{G1}$. $VG_2$ is asserted high until time $T_3$ when $V_{G1}$ is once again asserted high and another power cycle of flyback converter 400 begins.

Figure 6:
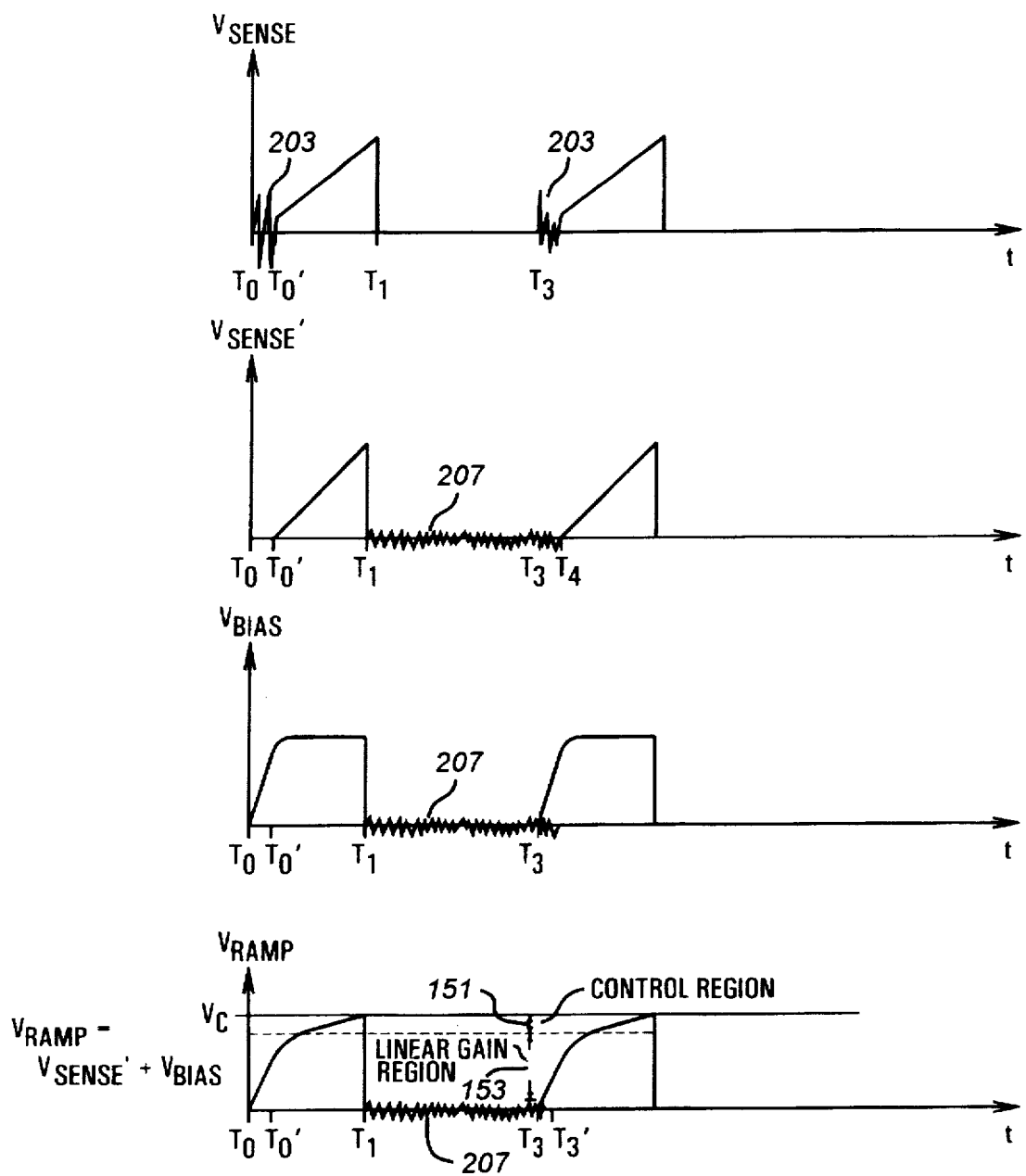
FIG. 6 illustrates operation of the ramp generator according to the present invention.

FIG. 6 illustrates the synchronous bias voltage $V_{BIAS}$ provided by the ramp generator 150 when $V_{SENSE}$ is grounded. $V_{BIAS}$, when transistor 202 conducts at time $T_0$, initially has a large slope linear gain region, as indicated at 153. The capacitor 136 filters out $V_{SENSE}$ during the time interval from $T_0$ to $T_0'$, the time interval for linear gain region 153. Because $V_{SENSE}$ is filtered out in this period, the control by the control circuit 280 is not related to $I_p$; however, the linear gain region 153 provides complete, continuous and stable control of the on-time of the transistor 202 and permits a continuous, predictable transition to near zero volts at time $T_0$ and $T_3$ as indicated in FIG. 6. This permits small conduction times for transistor 202.

Also shown in FIG. 6 is the waveform of $V_{SENSE}'$ which is the component of $V_{RAMP}$ without the $V_{BIAS}$ signal. As shown in FIG. 6, from time $T_0$ to time $T_0'$, $V_{SENSE}'$ is negated. From $T_0'$ to time $T_1$, $V_{SENSE}'$ rises upwardly in a linear fashion. This time interval includes the control region 151. Thus, using principels of superposition, the $V_{RAMP}$ signal is the summation of the $V_{BIAS}$ signal and the $V_{SENSE}'$ signal having the linear gain region 153 and the control region 151.

Capacitor 136 filters out the noise and also rounds off or smooths the otherwise abrupt corner or transition present at time $T_0$. This allows for very precise gain control by control circuit 180 when $I_p$ is small. When $V_{RAMP}$ reaches $V_C$ at time $T_1$, drive circuit 126 negates $V_{G1}$ and transistor 202 no longer conducts. Furthermore, at time $T_1$ $V_{G2}$ goes high resetting capacitor 136 and bringing $V_{RAMP}$ to zero volts.

In summary, the present invention relates to a control system for flyback converter 400 which adds the bias voltage $V_{BIAS}$ to the ramp voltage $V_{RAMP}$ during the conduction time of transistor 202. This effectively lowers the noise floor voltage level $V_{NOISE}$ to the level of the background noise 207 which allows small conduction times for transistor 202. Thus, the present invention minimizes the effects of the turn-on noise 203 generated during the initial conduction of transistor 202 which allows precision control for a small $I_p$.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim the following:

1. A control system for regulating a switching power supply that provides an output voltage, the power supply including an inductive element and a first switch having a series switched path for controlling current through the inductive element, the switch having a control terminal for activating the series switched path, the control system comprising:

a sensor coupled to the inductive element for providing a first signal indicative of the current in the inductive element, the first signal having an associated noise voltage;

a ramp generator circuit for receiving the first signal and generating a second signal, the second signal including a control region in which the slope of the second signal follows the first signal without the associated noise voltage, said ramp generator circuit comprising:

a first resistor for receiving the first signal and providing the second signal;

a bias voltage source;

a second resistor having a first terminal coupled to said bias voltage source and a second terminal providing the second signal; and a third resistor having a first terminal providing the second signal and a second terminal coupled to ground; and a control circuit for receiving the second signal and the output voltage and for providing a control signal to the first switch, the control signal provided to control the current in the inductive element in order to achieve a desired output voltage.

2. The control system of claim 1, farther including said ramp generator circuit adding a bias voltage to the first signal.

3. The control system of claim 2, wherein the bias voltage added by said ramp generator circuit includes a control region for noise immunization during conduction of said first switch.

4. The control system of claim 1, wherein the switching power supply is a flyback converter.

5. The control system of claim 1, wherein said sensor providing the first signal is a resistor coupled in series with the inductive element.

6. The control system of claim 4, wherein said sensor providing the first signal is a resistor coupled in series with the inductive element.

7. The control system of claim 1, said ramp generator circuit further comprising:

a capacitor having a first terminal coupled to the second signal and a second terminal coupled to ground.

8. The control system of claim 7, said ramp generator circuit comprising:

a second switch having a series switched path and a control terminal coupled to said control circuit for activating the series switched path of said second switch, the series switched path of said second switch coupled in parallel with said capacitor;

wherein said control circuit turns on the series switched path of said second switch during the off-time of the series switched path of said first switch.

9. The control system of claim 8, wherein said second switch is a metal-oxide-semiconductor field-effect-transistor.

10. The control system of claim 1, wherein said control circuit provides variable frequency current-mode control for the power supply.

* * * * *